Feb. 2, 1965  J. E. GEGNER  3,168,220
DEVICE FOR THE REMOVAL OF MATERIAL FROM TUBES
Filed Nov. 20, 1961

WITNESS
NORMAN G. TRAVISS

INVENTOR
JOHN E. GEGNER
BY Talbert Dick & Farley
ATTORNEYS

United States Patent Office 3,168,220
Patented Feb. 2, 1965

3,168,220
DEVICE FOR THE REMOVAL OF MATERIAL
FROM TUBES
John E. Gegner, Box 194, Centerville, Iowa
Filed Nov. 20, 1961, Ser. No. 153,330
3 Claims. (Cl. 222—98)

This invention relates to a device for removing flowable material such as tooth paste, shaving cream and like from collapsible tubes.

Such tube containers are universally used by the general public. The usual method of obtaining a quantity of material from a tube is to remove its cap and manually squeeze the cylinder portion of the tube. Seldom, if ever, is substantially all of the material squeezed from the tube. Also, as the material is reduced in the tube, the manual squeezing phase becomes more difficult. Furthermore, the tube becomes a most unsightly article.

Therefore, one of the principal objects of my invention is to provide a device that will successfully, easily remove material as needed from a collapsible tube container.

A further object of this invention is to provide a device for removing material from tube containers that will remove substantially all of the material from the tube.

A still further object of this invention is to provide a device for the removal of material from tube containers that is adaptable for installation on a wall surface.

A still further object of this invention is to provide a device for the removal of material from tube containers that causes the material being ejected from the tube to extend downwardly and rearwardly.

A still further object of this invention is to provide a device that will easily receive a filled tube container and will as easily permit the detachment of the tube after the material has been removed from the tube.

Still further objects of my invention are to provide a device for facilitating the removal of material from a collapsible tube container that is economical in manufacture, durable in use, and refined in appearance.

These and other objects will be apparent to those skilled in the art.

Figure 1:
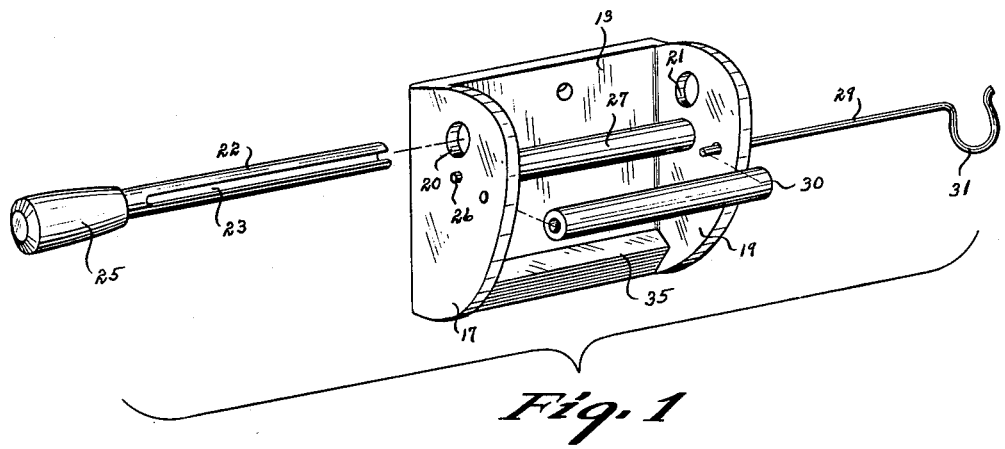
Figure 2:
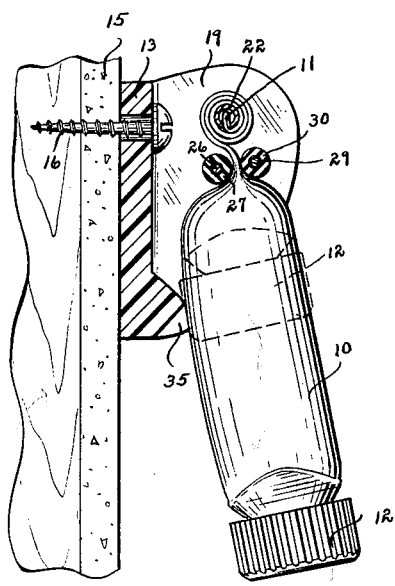
Figure 3:
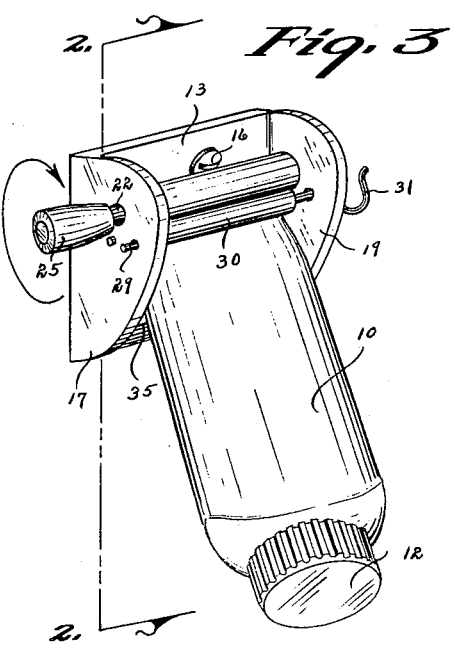

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a perspective exploded view of my device;
FIG. 2 is a side sectional view of the device in use and taken on line 2—2 of FIG. 3; and
FIG. 3 is a perspective view of the device in use.

In these drawings I have used the numeral 10 to generally designate a collapsible material holding tube container having the usual butt end closing bar 11, and the usual removable screw cap 12 on its other end.

It is to such tube containers that I apply my device and which I will now describe in detail. The numeral 13 designates a vertical base plate adapted to be secured to a wall or like 15 by a screw or like 16, as shown in FIG. 2. The numerals 17 and 19 designate two spaced apart rearwardly extending bearing ears on the base plate. The numerals 20 and 21 designate two horizontally in line holes in the upper portions, respectively, of the ears 17 and 19.

The numeral 22 designates a tubular shaft rotatably slidably detachably mounted through the holes 20 and 21. This tubular shaft has a longitudinal slot opening 23 in its wall for detachably receiving the butt end bar 11 of the tube 10. This slot opening 23 extends through the right end of the tubular shaft as shown in FIG. 1. The numeral 25 designates a hand grip portion of the left end of the tubular shaft to facilitate its manual rotation. Spaced below the holes 20 and 21 is a horizontal shaft 26 having its two end portions rotatably extending through the two bearing ears 17 and 19, respectively. The numeral 27 designates a resilient tube of rubber or like embracing the shaft 26 and between the two ears 17 and 19. To the rear of, and spaced apart from the shaft 26 is a shaft 29, slidably horizontally detachably extending through the two bearing ears 17 and 19, respectively, as shown in FIG. 3. The numeral 30 designates a resilient tube such as rubber or like detachably embracing the shaft 29 and positioned between the two ears 17 and 19, respectively. The numeral 31 designates a hook handle portion on the right end of the shaft 29. When the device is assembled the two rotatably mounted tubes 27 and 30 are parallel with each other, are closely spaced apart, are below the shaft 22, and together act as two squeeze wringer rollers as shown in FIG. 2.

To secure a tube 10 to my device, the shaft 29 is slidably removed to the right and the bar end 11 of the tube extended into the slot 23 and the tubular shaft 22 rotated a turn or so to start the wind up of the tube 10 onto the tubular shaft 22. The roller tube 27 will be forward of the inverted tube 10. Next the roller tube 30 is placed to the rear of the material tube 10, and the shaft 29 extended through the roller tube 30, as shown in FIG. 3. This completes the installation of the material tube 10. To obtain a quantity of material from the tube it is merely necessary to remove the cap 12 and rotate the handle grip portion 25. To cause the tube 10 to extend from the wall in a direction downwardly and rearwardly and at an angle therefrom, as shown in FIG. 2, I have provided a rearwardly extending bar portion 35 on the lower end portion of the plate 13. The handle hook 31 may be used to detachably support an item such as a toothbrush or like.

When the grip handle portion 25 is rotated, the end of the tube 10 will be progressively wound around the tubular shaft 22. The two rollers 27 and 30 (at each side of the tube 10, respectively,) will serve two purposes, i. e.,they will compress the material tube 10 as the tube 10 passes between them, and secondly, they will flatten the tube 10 into a ribbon rollable around the receiving tubular shaft 22.

To remove the material tube when it becomes empty, or at any time, it is merely necessary to outwardly and to the right, slide the shaft 29 from the base unit, and outwardly and to the left, slide the tubular shaft 22. The shaft 22 may easily be slid outwardly due to its slot opening extending to its right end. Therefore, it is not necessary to unwind the material tube from the shaft 22. The material tube remains wound in a compact unit for discarding.

Some changes may be made in the construction and arrangement of my device for the removal of material from tubes without departing from the real spirit and purpose of my invention, and it is my intention to cover by my claims, any modified forms of structure or use of mechanical equivalents which may be reasonably included within their scope.

I claim:
1. In a device for facilitating the removal of material from a collapsible tube,
   (a) a base portion,
   (b) two spaced apart bearing ears on said base portion,
   (c) a detachable shaft slidably rotatably extending through said to bearing ears,
   (d) a roller below said shaft and operatively rotatably mounted on said two bearing ears,
   (e) and a second roller below said shaft, adjacent said first roller and operatively detachable rotatably mounted on said two bearing ears; and (f) said shaft having a slit opening in its length for detachably receiving the closed end portion of a collapsible material tube.

2. In a device for facilitating the removal of material from a collapsible tube, (a) a base portion,
(b) two spaced apart bearing ears on said base portion,
(c) a detachable shaft slidably rotatably extending through said two bearing ears,
(d) a roller below said shaft and operatively rotatably mounted on said two bearing ears,
(e) and a second roller below said shaft, adjacent said first roller and operatively detachable rotatably mounted on said two bearing ears;
(f) said second roller and its rotatable mounting on said two bearing ears consisting of a tubular portion having a length less than the distance between said bearing ears, and having a shaft inserted through said portion and rotatably slidably extending through said two bearing ears; and
(g) said shaft having a slit opening in its length for detachably receiving the closed end portion of a collapsible material tube.

3. In a device for facilitating the removal of material from a collapsible tube, (a) a base portion,
(b) two spaced apart bearing ears on said base portion,
(c) a detachable shaft slidably rotatably extending through said two bearing ears,
(d) a roller below said shaft and operatively rotatably mounted on said two bearing ears,
(e) a second roller below said shaft, adjacent said first roller and operatively detachably rotatably mounted on said two bearing ears;
(f) said shaft having a slit opening in its length for detachably receivnig the closed end portion of a collapsible material tube; and
(g) a ledge projection on said base below said rollers and adapted to engage the tube and to cause the tube to depend angularly away from said base portion.

References Cited by the Examiner

UNITED STATES PATENTS

| | | | |
|---|---|---|---|
| 1,417,271 | 5/22 | Maer | 222—100 X |
| 2,542,678 | 2/51 | Keefer | 222—99 X |

RAPHAEL M. LUPO, *Primary Examiner.*

SAMUEL F. COLEMAN, LOUIS J. DEMBO,
*Examiners.*